United States Patent
Formenti et al.

(10) Patent No.: US 9,751,428 B2
(45) Date of Patent: Sep. 5, 2017

(54) CANTILEVER FOR SUPPORTING A CATENARY TO SUPPLY ENERGY TO A VEHICLE

(71) Applicant: ALSTOM TRANSPORT TECHNOLOGIES, Levallois Perret France (FR)

(72) Inventors: Leonardo Formenti, Barzano (IT); Andrea Perego, Monza (IT)

(73) Assignee: ALSTOM TRANSPORT TECHNOLOGIES, Levallois Perret (FR)

(*) Notice: Subject to any disclaimer, the term of this patent is extended or adjusted under 35 U.S.C. 154(b) by 0 days.

(21) Appl. No.: 14/877,667

(22) Filed: Oct. 7, 2015

(65) Prior Publication Data
US 2016/0107541 A1 Apr. 21, 2016

(30) Foreign Application Priority Data

Oct. 15, 2014 (EP) ..................................... 14306631

(51) Int. Cl.
*E21F 17/02* (2006.01)
*B60M 7/00* (2006.01)
*B60M 1/20* (2006.01)
*F16L 3/00* (2006.01)

(52) U.S. Cl.
CPC ............... *B60M 7/00* (2013.01); *B60M 1/20* (2013.01); *F16L 3/00* (2013.01)

(58) Field of Classification Search
CPC . B60M 1/20; B60M 1/22; B60M 1/23; B60M 7/00
See application file for complete search history.

(56) References Cited

U.S. PATENT DOCUMENTS

| 966,102 A | * | 8/1910 | Kempton | B60M 1/23 191/39 |
| 1,801,474 A | | 4/1931 | Williams | |
| 3,644,688 A | * | 2/1972 | Tustin | B60M 1/20 191/40 |
| 4,679,672 A | * | 7/1987 | Seddon | B60M 1/20 174/45 R |

(Continued)

FOREIGN PATENT DOCUMENTS

| CN | 202753803 U | 2/2013 |
| FR | 422364 A | 3/1911 |
| FR | 843042 A | 6/1939 |

OTHER PUBLICATIONS

EP Search Report application No. 14306631 dated Mar. 20, 2015.

*Primary Examiner* — Amy Sterling
(74) *Attorney, Agent, or Firm* — Knobbe Martens Olson & Bear LLP

(57) ABSTRACT

A cantilever supports a catenary to supply energy to a vehicle. The cantilever includes a cross-member adapted to be attached to a support structure, the cross-member extending along a longitudinal axis (X-X), and at least one attachment connected to the cross-member. The cross-member includes an outer surface, the outer surface including at least a first side having a non-circular shape in a section plane (II-II) that is orthogonal to the longitudinal axis (X-X). The attachment includes at least one collar encircling the cross-member, and the collar includes at least one contact face in contact with the at least first side.

11 Claims, 5 Drawing Sheets

(56) References Cited

U.S. PATENT DOCUMENTS

| | | | | |
|---|---|---|---|---|
| 5,881,851 A | * | 3/1999 | Cipriani | B60M 1/20 191/41 |
| 8,752,684 B2 | * | 6/2014 | Pasta | B60M 1/20 191/41 |
| 9,260,037 B2 | * | 2/2016 | Graham | B60M 1/20 |

* cited by examiner

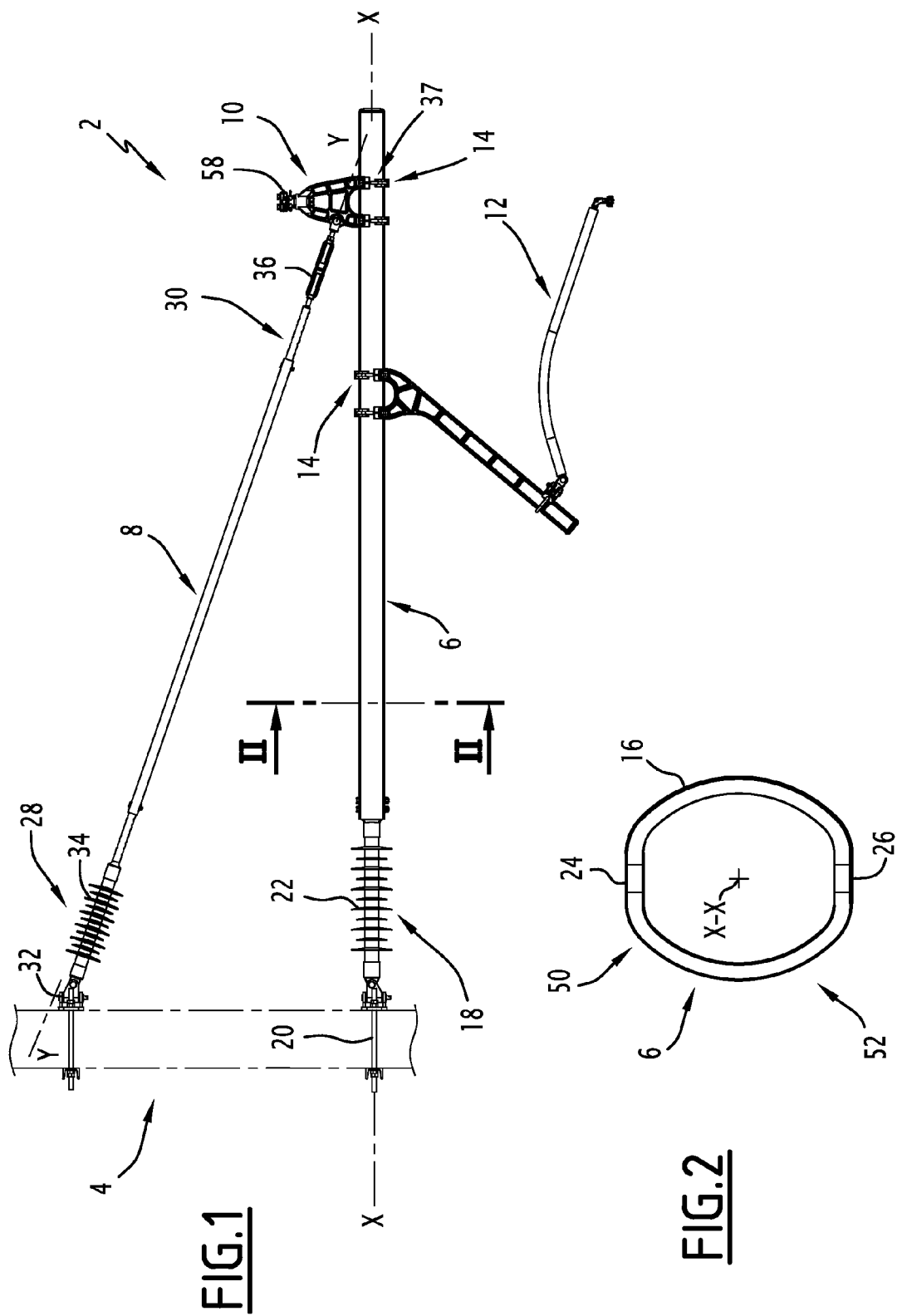

CANTILEVER FOR SUPPORTING A CATENARY TO SUPPLY ENERGY TO A VEHICLE

The present invention concerns a cantilever for supporting a catenary to supply energy to a vehicle, of the type comprising a cross-member adapted to be attached to a support structure, the cross-member extending along a longitudinal axis, and at least one attachment connected to the cross-member.

The invention applies to the field of the support of catenaries.

It is known to use cantilevers to support the cables of the catenary. Such cantilevers usually comprise several cable supports attached to a cross-member that protrudes from a pylon or a post.

However, such cantilevers are not totally satisfying.

In such cantilevers, it is difficult to arrange in a single plane the cable supports which are attached around a longitudinal axis of the cross-member, thus entailing a misalignment between the cable supports. This misalignment may entail tension forces on the cables, said tension forces being able to deteriorate the cables and lead to their breakage.

A purpose of the invention is to solve the problem of misalignment between the cable supports on a cross-member.

To this end, the invention concerns a cantilever of the aforementioned type, the cantilever being characterized in that the cross-member includes an outer surface, the outer surface comprising at least a first side having a non-circular shape in a section plane that is orthogonal to the longitudinal axis, in that the attachment comprises at least one collar encircling the cross-member, and in that the collar comprises at least one contact face in contact with said at least first side.

Thanks to the invention, the cable supports that comprise an attachment of the aforementioned type cannot rotate around the longitudinal axis of the cross-member. Therefore, the cable supports remain aligned in the same plane.

According to further aspects of the invention which are advantageous but not compulsory, such a cantilever may incorporate one or several of the following features:

the contact face of the collar has a shape that is complementary with said first side;
the outer surface of the cross-member has a convex shape in the section plane;
the outer surface of the cross-member has a barrel-shape in the section plane;
the attachment includes a cable clamp able to support a cable of the catenary;
at least one attachment comprises two collars;
the cantilever includes a guy-wire for supporting the cross-member, the guy-wire extending along a corresponding axis, the guy-wire including a proximal end adapted to be attached to the support structure, and a distal end attached to the cross-member through the attachment;
the guy-wire includes a turnbuckle to enable the tuning of the length of said guy-wire along the corresponding axis;
the attachment of the guy-wire includes a cable clamp, said attachment and said cable clamp forming a cable support;
each collar includes a flange, a screw and nuts to secure the screw to the flange,
the flange being placed on the first side of the cross-member,
the screw being placed on a second side of the cross-member that is radially opposed to the first side with respect to the longitudinal axis,
the flange receiving both ends of the screw to encircle the cross-member,
the flange comprising a contact face, the contact face being in contact with at least a part of the first side;
each collar further comprises an elastic plate comprising an inner face and an outer face,
the elastic plate being arranged between the screw and the second side of the cross-member,
the inner face of the elastic plate being in elastic contact with at least two points of the second side of the cross-member;
the cantilever comprises at least one cable support, said cable support being attached to the cross-member through the attachment;
the cantilever includes a cable support comprising a registration bracket and a steady arm,
the registration bracket being attached to the cross-member through the attachment,
the registration bracket extending along a corresponding axis,
the registration bracket comprising an outer surface having a non-circular shape in a plane orthogonal to the said axis,
the steady arm comprising a proximal end attached to the registration bracket through an intermediate attachment,
said intermediate attachment comprising at least one contact face in contact with at least a part of the outer surface of the registration bracket that has the non-circular shape in said plane orthogonal to said axis.

The invention will now be explained in correspondence with the annexed figures, and as an illustrative example, without restricting the object of the invention. In the annexed figures:

FIG. 1 is as side view of a first embodiment of a cantilever according to the invention;

FIG. 2 is a cross-section of a cross-member of the cantilever of FIG. 1, in a plane orthogonal to a longitudinal axis of said cross-member;

Figure 3:
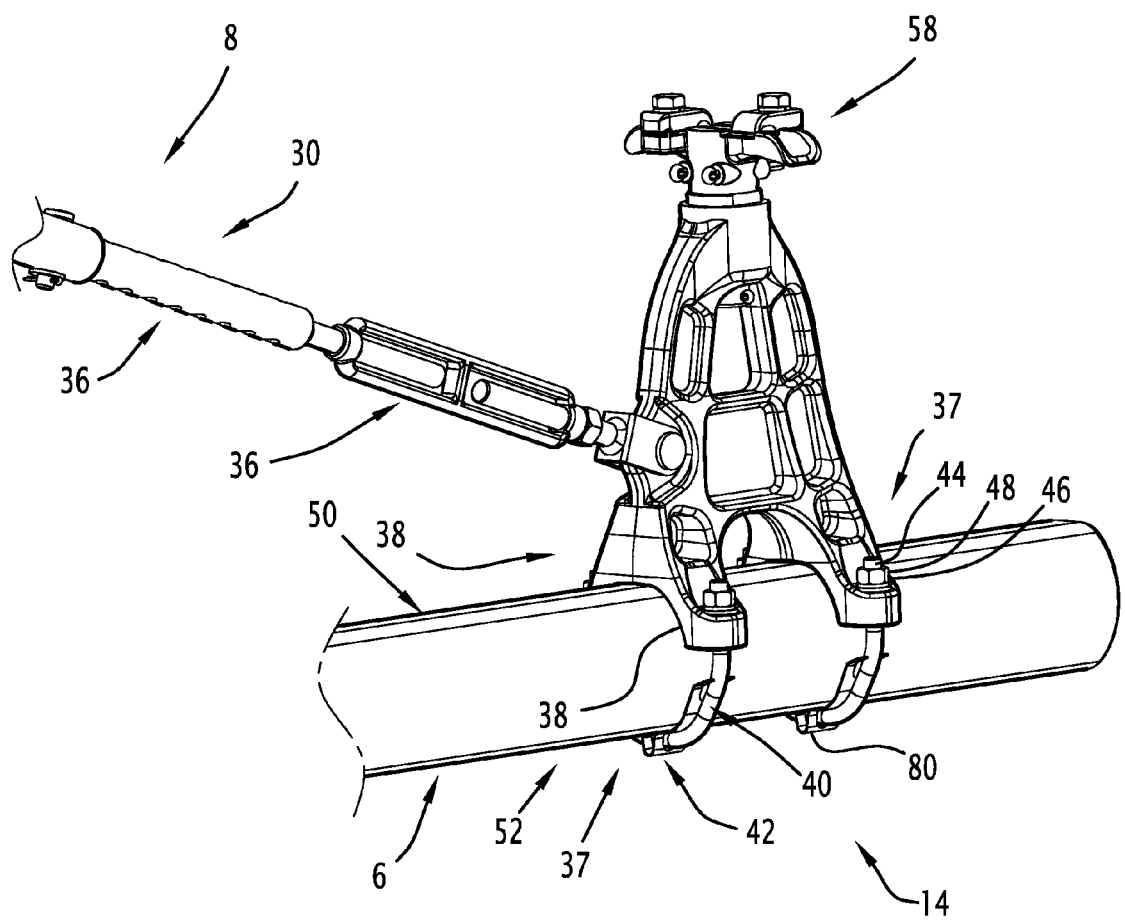
FIG. 3 is a view in perspective of a cable support of the cantilever of FIG. 1.

A cantilever 2 according to the invention is shown on FIG. 1.

The cantilever 2 is adapted to support a catenary for supplying energy to a vehicle, for instance a railway vehicle, a trolley or a subway vehicle.

The cantilever 2 is adapted to be attached to a support structure 4. For instance, the support structure 4 is a post or a pylon.

The cantilever 2 comprises a cross-member 6 and a guy-wire 8 to support the cross-member 6. The cantilever 2 also comprises an upper cable support 10 and a lower cable support 12.

The upper cable support 10 is adapted to support a messenger wire of the catenary. The lower cable support 12 is adapted to support a contact wire of the catenary.

The guy-wire 8, the upper cable support 10 and the lower cable support 12 are attached to the cross-member 6 through attachments 14.

The cross member 6 extends along a longitudinal axis X-X. For instance, the cross-member 6 is a hollow tube.

The cross-member 6 is metallic. For instance, the cross-member 6 is made of steel, made of aluminum or made of an aluminum alloy.

In another embodiment, the cross-member 6 is made of fiberglass or made of composite material.

Preferably, the linear density of the cross-member 6 is less than 10 kg/m, advantageously less than 7 kg/m, for instance less than or equal to 5.5 kg/m.

The cross-member 6 comprises an outer surface 16. Advantageously, the outer surface 16 is convex and continuous.

The cross-member 6 also comprises a proximal end 18 including a strap 20 to attach the cross member 6 to the support structure 4. Advantageously, the proximal end 18 also includes an isolator 22 to isolate electrically the cross-member 6 from the support structure 4.

As shown in FIG. 2, in a section plane II-II orthogonal to the longitudinal axis X-X, the outer surface 16 of the cross-member 6 has a non-circular shape, advantageously a non-circular convex shape, for instance a barrel-shape.

The cross-member 6 comprises an upper flat surface 24 and a lower flat surface 26. The flat surfaces 24, 26 are parallel.

In the present embodiment, the guy-wire 8 is rigid.

The guy-wire 8 extends along a corresponding axis Y-Y

The guy-wire 8 comprises a proximal end 28 and a distal end 30.

The proximal end 28 includes a strap 32 to attach the guy-wire 8 to the support structure 4. Advantageously, the proximal end 28 of the guy-wire also includes an isolator 34 to isolate electrically the guy-wire 8 from the support structure 4.

As shown on FIG. 3, the distal end of the guy-wire 8 comprises a turnbuckle 36 in series with the attachment 14.

Figure 4:
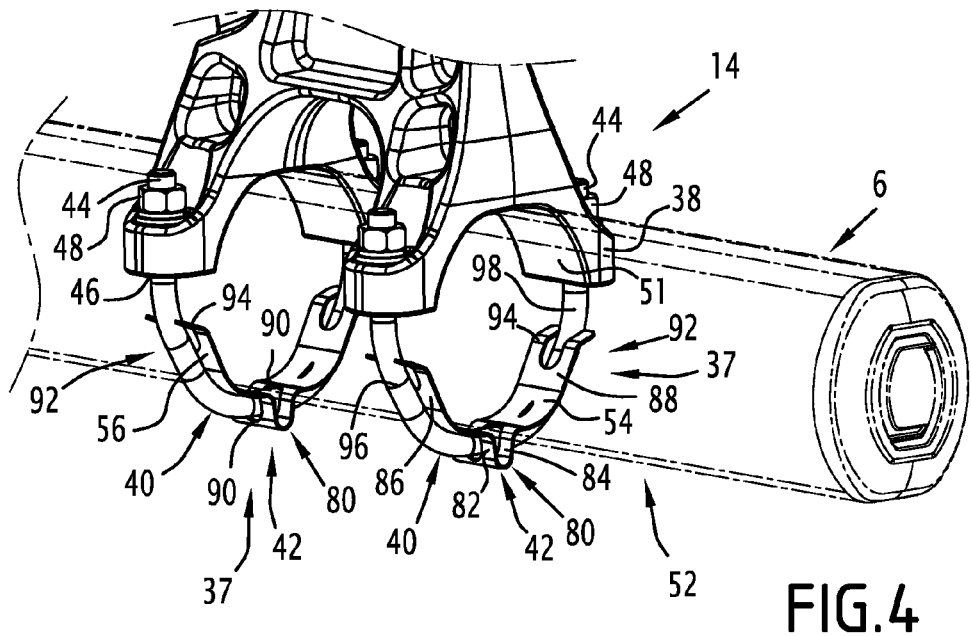
FIG. 4 is a view in perspective of an attachment of the cable support of FIG. 3.

As shown in FIGS. 3 and 4, the attachment 14 comprises two collars 37. Each collar 37 encircles the cross-member 6, that is to say that each collar 37 is arranged around the outer surface 16 of the cross-member 6, continuously extending around the outer-surface 16.

Each collar 37 includes a flange 38, a screw 40 and an elastic plate 42.

For instance, the screw 40 is a U-shaped screw. The screw 40 comprises two threaded ends 44. The flange 38 comprises two openings 46. Each end 44 of the screw 40 is placed in a corresponding opening 46 of the flange 38, so that the flange 38 and the screw 40 encircle the cross-member 6.

Each collar 37 further includes two nuts 48 to secure the screw 40 to the flange 38.

The flange 38 is arranged on a first side 50 of the cross-member 6. The first side 50 has a non-circular shape in the section plane II-II. The first side 50 comprises the upper flat surface 24 and/or the lower flat surface 26.

The flange 38 includes a contact face 51 having a shape that is complementary with the first side 50.

Alternatively, the flange 48 comprises a plurality of contact sections that are in contact with at least a part of the first side 50.

The screw 40 is arranged on a second side 52 of the cross-member that is radially opposed to the first side 50 with respect to the longitudinal axis X-X. For instance, the second side 52 has a non-circular shape in the section plane II-II.

The elastic plate 42 comprises an inner face 54 and an outer face 56.

As shown in FIGS. 3 and 4, the elastic plate 42 further includes an arch 80 comprising a first lateral side 82 and a second lateral side 84. Furthermore, the elastic plate 42 comprises a first blade 86 connected to the first lateral side 82 of the arch 80 and a second blade 88 connected to the second lateral side 84 of the arch 80. The first blade 86 and the second blade 88 protrude in opposite directions from the arch 80.

Each lateral side 82, 84 of the arch 80 comprises an opening 90. The openings 90 of the first lateral side 82 and the second lateral side 84 respectively face each other.

Each blade 86, 88 comprises a free end 92. Each free end 92 includes a fork 94 that is oriented away from the inner face 54.

The elastic plate 42 is arranged between the screw 40 and the outer surface 16 of the cross-member 6, the inner face 54 facing the second side 52 of the cross-member 6. The screw 40 is inserted in the openings 90 of the arch 80 of the elastic plate 42. A first intermediate part 96 of the screw 40 rests on the fork 94 of the first blade 86. A second intermediate part 98 of the screw 40 rests on the fork 94 of the second blade 88.

The nuts 48 are tightened so that the screw 40 applies a bending force on the outer face 56 of the elastic plate 42 to put the inner face 54 in elastic contact with at least two points of the second side 52 of the cross-member 6.

For instance, the elastic plate 42 is a metal plate.

As shown in FIGS. 1 and 3, the attachment 14 of the guy-wire 8 further comprises a cable clamp 58 to clamp a messenger cable of the catenary. Said attachment 14 and said cable clamp 58 form the upper cable support 10.

The location of the lower cable support 12 is opposed to the location of the upper cable support 10 with regards to the longitudinal axis X-X.

Figure 5:
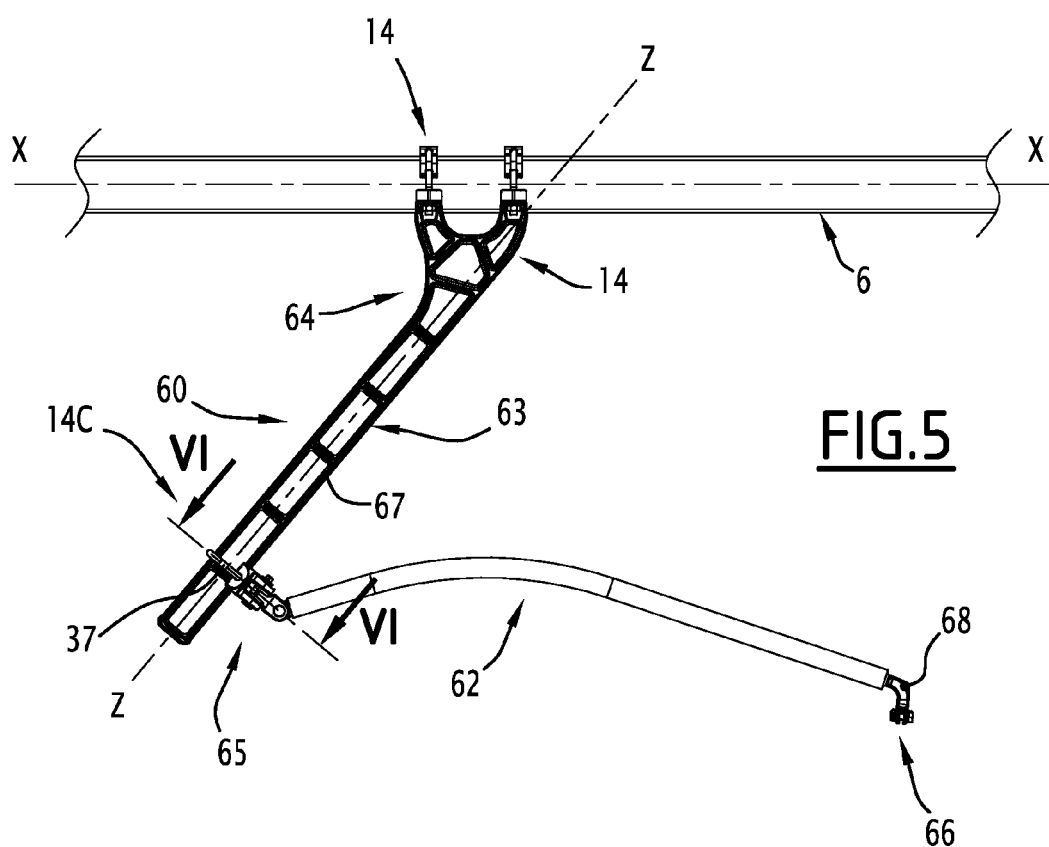
FIG. 5 is a side view of a cable support of the cantilever of FIG. 1 that is adapted to support a contact wire.

As shown in FIGS. 1 and 5, the lower cable support 12 comprises a registration bracket 60 and a steady arm 62.

The registration bracket 60 and the steady arm 62 define a plane that is the same as the plane defined by the longitudinal axis X-X and the axis Y-Y of the guy-wire 8.

The registration bracket 60 includes the attachment 14 and a straight rod 63 connected with the attachment 14. The rod 63 extends along an axis Z-Z.

Figure 6:
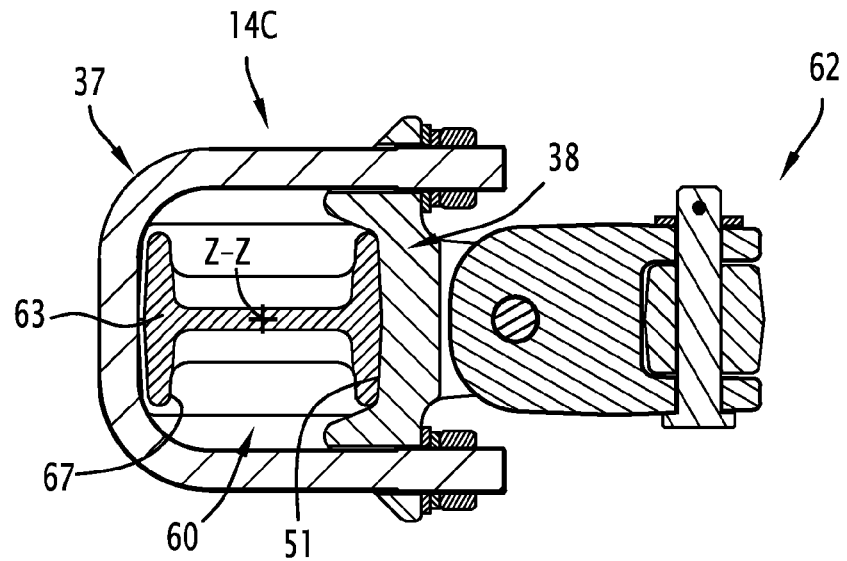
FIG. 6 is a cross-section of an attachment of the cable support of FIG. 5, in a plane orthogonal to an axis of a rod of said cable support.

The registration bracket 60 comprises an outer surface 67. In a plane orthogonal to the axis Z-Z, the outer surface 63 of the registration bracket 60 has a non-circular shape, for instance an H-shape, as shown in FIG. 6.

The registration bracket 60 comprises a fastening end 64 attached to the cross-member 6 through an attachment 14 similar to the attachment 14 of the upper cable support 10.

The steady arm 62 comprises a proximal end 65 and a distal end 66.

The proximal end 65 is attached to the registration bracket 60 through an intermediate attachment 14C. For instance, the attachment 14C of the steady arm 62 differs from the attachment 14 of the upper cable support 10 in that the attachment 14C comprises only one collar 37. For instance, the attachment 14C of the steady arm 62 also differs from the attachment 14 of the upper cable support 10 in that the contact face 51 of the flange 38 of the attachment 14C has a shape that is complementary with the shape of at least a non-circular part of the outer surface 67 of the registration bracket 60.

The distal end 66 of the steady arm 62 comprises a cable clamp 68 to clamp a contact cable of the catenary.

The junction between each cable support 10, 12 and the corresponding attachment 14 is rigid.

Preferably, the cantilever 2 described above is used in the case of railway applications using a 25 kV voltage.

Figure 7:
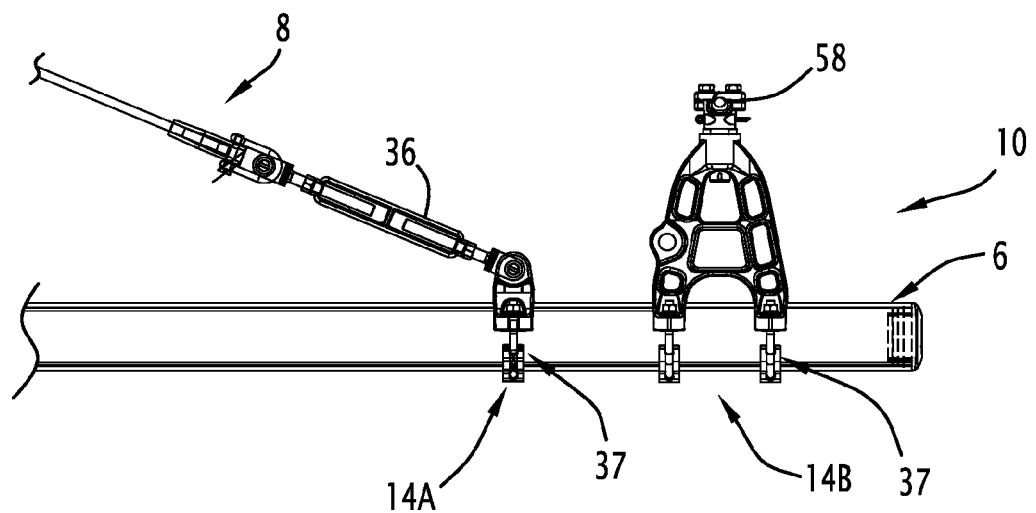
FIG. 7 is a side view of a distal end of a guy-wire of a second embodiment of the cantilever according to the invention.

In another embodiment, shown in FIG. 7, the guy-wire 8 is attached to the cross-member 6 through a corresponding first attachment 14A, while the cable clamp 58 is attached to a corresponding second attachment 14B distinct from the first attachment 14A to form the upper cable support 10.

For instance, the first attachment 14A comprises only one collar 37.

Figure 8:
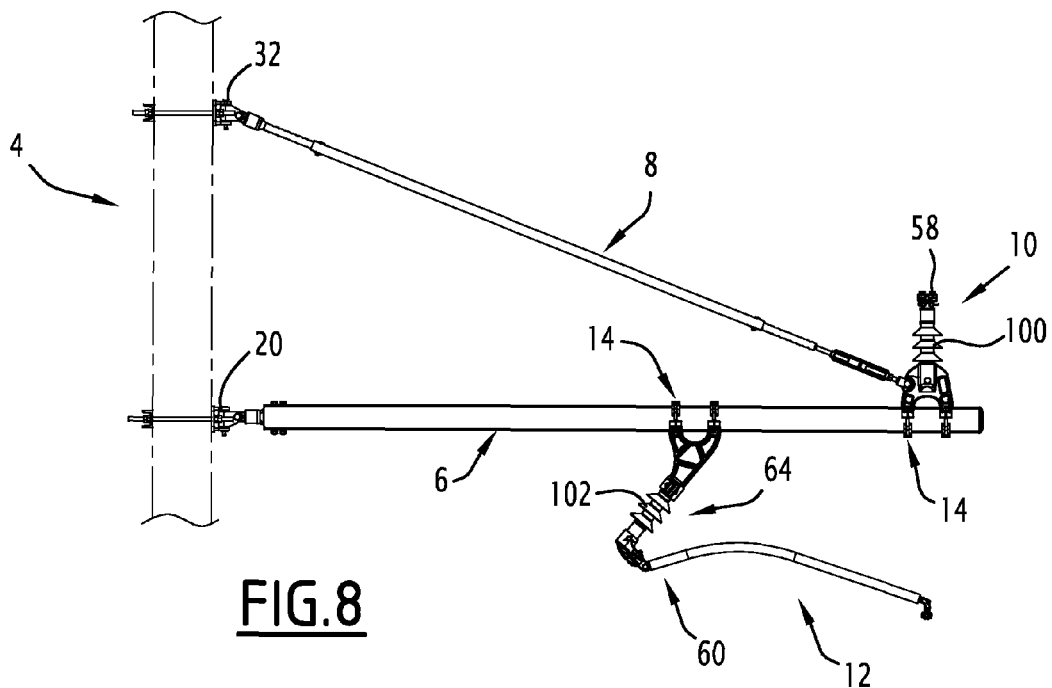
FIG. 8 is a side view of a third embodiment of a cantilever according to the invention.

In another embodiment, show in FIG. 8, the cross-member 6 and the guy-wire 8 do not comprise isolators. In this case, a first isolator 100 is arranged between the cable clamp 58 and the attachment 14 of the upper cable support 10. A second isolator 102 is located at the fastening end 64 of the registration bracket 60, the second isolator 102 being arranged between the registration bracket 60 and the attachment 14 of the lower cable support 12.

Preferably, such a cantilever is used in the case of railway applications using a 3 kV voltage.

Figure 9:
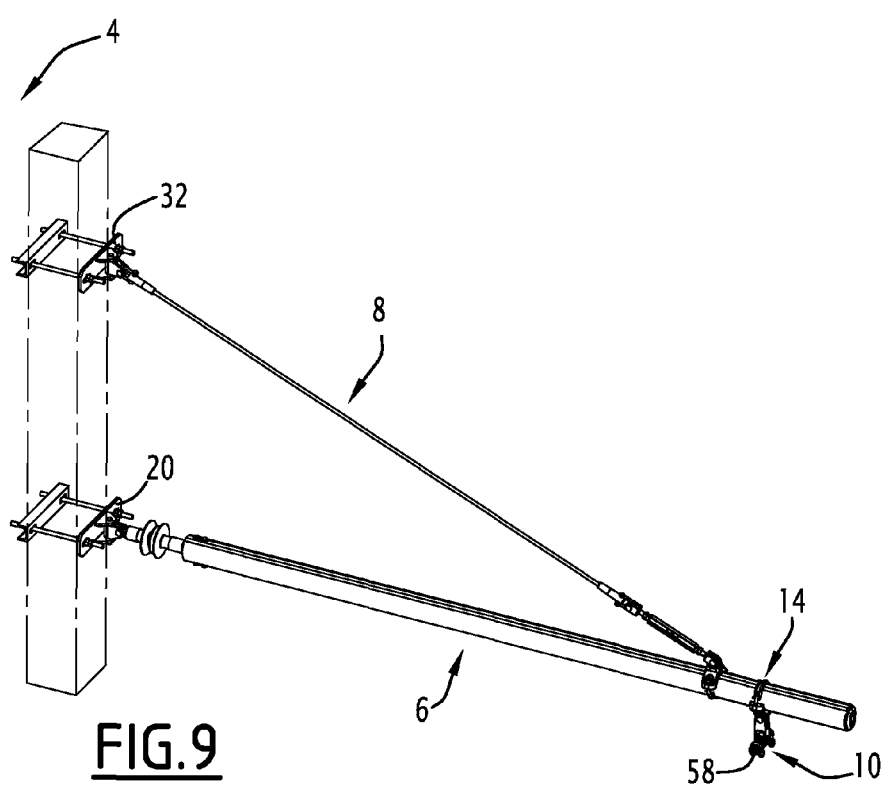
FIG. 9 is a view in perspective of a fourth embodiment of a cantilever according to the invention.

In another embodiment, show in FIG. 9, the guy-wire 8 is made of an insulating material.

Furthermore, the guy-wire 8 does not comprise an isolator.

Preferably, the guy-wire 8 is flexible.

Such an embodiment is preferably used for trolley applications.

In another embodiment (not shown), the cantilever 2 differs from the cantilever 2 of FIG. 9 in that the cross-member 6 is made of an insulating material, for instance made of fiberglass or made of a composite material. In this case, the cross-member 6 does not comprise an isolator.

Such an embodiment is preferably used for trolley applications.

The shape of the outer surface 16 of the cross-member 6 is non-circular, and the attachments 14 are designed according said non-circular shape. Therefore, the attachments 14 are able to prevent a rotation of the cable supports 10, 12 around the longitudinal axis X-X of the cross-member 6. Therefore, there is no undesired tension force that is applied to the cables of the catenary.

Furthermore, the non-circular shape of the outer surface 16 of the cross-member 6 and the attachments 14 enables a simple and time-saving installation of the cantilever 2, as the outer surface 16 acts as a guide during the installation.

To adjust the tilt of the cross-member 6 with regards to a horizontal plane, an operator acts on the turnbuckle 36 to tune the length of the guy-wire 8 along the corresponding axis Y-Y, without untightening the attachment 14 of the guy-wire 8 to displace said attachment 14 along the longitudinal axis X-X of the cross-member 6. This enables a simple and time-saving operation of the cantilever 2.

The elastic plate 42 maintains a constant force on the cross-member 6 over time, thus avoiding the sliding of the attachments 14 in case of vibrations or thermal dilatation.

The convex shape of the outer surface 16 of the cross-member 6 prevents from the deposit of material or dust.

The presence of the collars 37 enables to move the attachment 14 along the cross-member 6 without removing said attachment 14.

The fact that the attachment 14 of the guy-wire 8 includes a cable clamp 58 to form the upper cable support 10 enables a faster installation of the guy-wire 8 and the cable support 10, compared to the case where the attachment 14 of the guy-wire 8 is distinct from the attachment of the cable support 10.

What is claimed is:

1. A cantilever for supporting a catenary to supply energy to a vehicle, the cantilever comprising a cross-member adapted to be attached to a support structure, the cross-member extending along a longitudinal axis, and at least one attachment connected to the cross-member,
wherein the cross-member includes an outer surface, the outer surface comprising at least a first side having a non-circular shape in a section plane that is orthogonal to the longitudinal axis,
wherein the at least one attachment comprises at least one collar encircling the cross-member,
wherein the collar comprises at least one contact face in contact with said at least first side,
wherein each collar includes a flange, a screw and nuts to secure the screw to the flange,
the flange being placed on the first side of the cross-member,
the screw being placed on a second side of the cross-member that is radially opposed to the first side with respect to the longitudinal axis,
the flange receiving both ends of the screw to encircle the cross-member,
the flange comprising a contact face, the contact face being in contact with at least a part of the first side, and
wherein each collar further comprises an elastic plate comprising an inner face and an outer face,
the elastic plate being arranged between the screw and the second side of the cross-member,
the inner face of the elastic plate being in elastic contact with at least two points of the second side of the cross-member.

2. The cantilever according to claim 1, wherein the contact face of the collar has a shape that is complementary with said first side.

3. The cantilever according to claim 1, wherein the outer surface of the cross-member has a convex shape in the section plane.

4. The cantilever according to claim 3, wherein the outer surface of the cross-member has a barrel-shape in the section plane.

5. The cantilever according to claim 1, wherein the at least one attachment includes the cable clamp able to support a cable of the catenary.

6. The cantilever according to claim 1, wherein the at least one attachment comprises two collars.

7. The cantilever according to claim 1, wherein the cantilever comprises at least one cable support attached to the cross-member through one of the at least one attachment.

8. The cantilever according to claim 7, wherein the at least one cable support comprising a registration bracket and a steady arm,
the registration bracket being attached to the cross-member through the attachment,
the registration bracket extending along a corresponding axis, the registration bracket comprising an outer surface having a non-circular shape in a plane orthogonal to the said axis, the steady arm comprising a proximal end attached to the registration bracket through an intermediate attachment, said intermediate attachment comprising at least one contact face in contact with at least a part of the outer surface of the registration bracket that has the non-circular shape in said plane orthogonal to said axis.

9. The cantilever according to claim 1, wherein the cantilever includes a guy-wire for supporting the cross-member, the guy-wire extending along a corresponding axis, the guy-wire including a proximal end adapted to be attached to the support structure, and a distal end attached to the cross-member through the at least one attachment.

10. The cantilever according to claim 9, wherein the at least one attachment of the guy-wire includes a cable clamp, said at least one attachment and said cable clamp forming a cable support.

11. The cantilever according to claim 9, wherein the guy-wire includes a turnbuckle to enable the tuning of the length of said guy-wire along the corresponding axis.

* * * * *